(12) United States Patent
Humenay

(10) Patent No.: US 9,606,535 B2
(45) Date of Patent: Mar. 28, 2017

(54) SPATIAL RECOGNITION IN AN AUTONOMOUS VEHICLE GROUP

(71) Applicant: SIKORSKY AIRCRAFT CORPORATION, Stratford, CT (US)

(72) Inventor: Eric Humenay, State College, PA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 30 days.

(21) Appl. No.: 14/802,284

(22) Filed: Jul. 17, 2015

(65) Prior Publication Data
US 2016/0026179 A1 Jan. 28, 2016

Related U.S. Application Data

(60) Provisional application No. 62/027,324, filed on Jul. 22, 2014.

(51) Int. Cl.
| | | |
|---|---|---|
| H04W 24/00 | (2009.01) | |
| G05D 1/00 | (2006.01) | |
| G05D 1/10 | (2006.01) | |
| G05D 1/02 | (2006.01) | |
| H04L 29/08 | (2006.01) | |
| H04W 4/02 | (2009.01) | |
| H04W 24/02 | (2009.01) | |
| H04W 76/02 | (2009.01) | |
| H04W 84/18 | (2009.01) | |

(52) U.S. Cl.
CPC ......... *G05D 1/0027* (2013.01); *G05D 1/0022* (2013.01); *G05D 1/0088* (2013.01); (Continued)

(58) Field of Classification Search
CPC ......... H04L 2012/2841; H04B 1/3822; G01C 21/00; H04H 20/61; H04H 20/71; (Continued)

(56) References Cited

U.S. PATENT DOCUMENTS

| | | | | |
|---|---|---|---|---|
| 3,312,971 A | * | 4/1967 | Gehman | G01S 13/76 342/36 |
| 3,573,818 A | | 4/1971 | Lennon, Jr. et al. | |

(Continued)

FOREIGN PATENT DOCUMENTS

GB 2476149 A 6/2011

OTHER PUBLICATIONS

Gyroscopes.org, "Uses for Gyroscopes," 2013, downloaded from http://www.gyroscopes.org/uses.asp on Nov. 22, 2013, 3 pages.
(Continued)

*Primary Examiner* — Dalena Tran
(74) *Attorney, Agent, or Firm* — Cantor Colburn LLP

(57) ABSTRACT

An autonomous vehicle includes a sensor interface coupled to a gyroscope system, a wireless communication interface, a processor, and memory. The memory has instructions stored thereon that, when executed by the processor, cause the autonomous vehicle to establish a plurality of wireless communication links with two or more vehicles in a group including the autonomous vehicle and the two or more vehicles. A signal strength of each of the wireless communication links is monitored to determine an observed signal strength of each of the wireless communication links. A desired position of the autonomous vehicle is determined based on an expected signal strength of each of the wireless communication links. A position adjustment of the autonomous vehicle is initiated based on a difference between the expected signal strength and the observed signal strength in combination with data from the gyroscope system.

13 Claims, 5 Drawing Sheets

(52) U.S. Cl.
CPC ............... *G05D 1/02* (2013.01); *G05D 1/104* (2013.01); *H04L 67/12* (2013.01); *H04W 4/02* (2013.01); *H04W 24/02* (2013.01); *H04W 76/025* (2013.01); *H04W 84/18* (2013.01)

(58) Field of Classification Search
CPC ..... H04W 4/02; H04W 64/006; H04W 4/023; H04W 76/025; B25J 13/006; G01S 13/931; G01S 19/51; G01S 5/0072; G01S 5/0284
USPC ..... 701/2, 23; 705/333; 340/10.1; 455/456.1
See application file for complete search history.

(56) References Cited

U.S. PATENT DOCUMENTS

| | | | | |
|---|---|---|---|---|
| 8,855,835 | B2* | 10/2014 | Kumabe | G05D 1/024 701/2 |
| 2008/0243372 | A1* | 10/2008 | Bodin | G05D 1/0027 701/23 |
| 2015/0105946 | A1* | 4/2015 | Kumar | B64C 39/024 701/3 |

OTHER PUBLICATIONS

PlanePlotter, "PlanePlotter Receives and Decodes Live Digital Position Report From Aircraft and Plots Them on a Chart," downloaded from http://www.coaa.co.uk/planeplotter.htm on Nov. 22, 2013, 11 pages.

Simon Morgenthaler, "UAVNet: A Prototype of a Highly Adaptive and Mobile Wireless Mesh Network Using Unmanned Aerial Vehicles (UAVs)," University of Bern, May 2012, 111 pages.

Gil-Pinto et al., "Wireless Reception Signal Strength for Relative Positioning in a Vehicle Robot Formation", Robotics Symposium, 2006. LARS '06. IEEE 3rd Latin American, IEEE, PI, Oct. 1, 2006, pp. 100-105.

Extended European Search Report issued on Dec. 17, 2015 in corresponding EP Patent Application No. 15 17 7679.

* cited by examiner

SPATIAL RECOGNITION IN AN AUTONOMOUS VEHICLE GROUP

CROSS-REFERENCE TO RELATED APPLICATIONS

This application claims the benefit of U.S. provisional patent application Ser. No. 62/027,324 filed Jul. 22, 2014, the entire contents of which are incorporated herein by reference.

BACKGROUND OF THE INVENTION

The subject matter disclosed herein generally relates to groups of autonomous vehicles, and more particularly to spatial recognition in an autonomous vehicle group.

Autonomous aerial vehicles operate without a human pilot using autonomous controls. In some applications, multiple autonomous aerial vehicles are used together in a group or swarm to accomplish a wide-scale or distributed task. Adding complexity to each of the vehicles drives up total system cost. As more functionality and features are added to each vehicle, the operating costs can increase due to added weight and power requirements.

When multiple autonomous aerial vehicles are managed as group, control system requirements become more challenging across the group. Knowledge of the precise location of each vehicle may not be as important as a relative position, for example, when flying in a formation. As the number of autonomous aerial vehicles in the group is increased, establishing and maintaining effective communication between the autonomous aerial vehicles may also become more challenging, particularly as the group spreads out over a wider range of operation. Exchanging precise position data between vehicles can be useful, but latency involved in acquiring, relaying, and interpreting the information may reduce accuracy when the vehicles are in motion.

BRIEF DESCRIPTION OF THE INVENTION

According to an aspect of the invention, an autonomous vehicle includes a sensor interface coupled to a gyroscope system, a wireless communication interface, a processor, and memory. The memory has instructions stored thereon that, when executed by the processor, cause the autonomous vehicle to establish a plurality of wireless communication links with two or more vehicles in a group including the autonomous vehicle and the two or more vehicles. A signal strength of each of the wireless communication links is monitored to determine an observed signal strength of each of the wireless communication links. A desired position of the autonomous vehicle is determined based on an expected signal strength of each of the wireless communication links. A position adjustment of the autonomous vehicle is initiated based on a difference between the expected signal strength and the observed signal strength in combination with data from the gyroscope system.

In addition to one or more of the features described above or below, or as an alternative, further embodiments could include where the wireless communication links form a portion of a wireless mesh network.

In addition to one or more of the features described above or below, or as an alternative, further embodiments could include where the autonomous vehicle receives control commands from a commander node through the wireless mesh network.

In addition to one or more of the features described above or below, or as an alternative, further embodiments could include where the autonomous vehicle and the two or more vehicles are autonomous aerial vehicles and are controlled in the group by the commander node.

In addition to one or more of the features described above or below, or as an alternative, further embodiments could include where the autonomous vehicle tracks an estimated position of the two or more vehicles based on a signal strength-to-distance mapping applied to the observed signal strength.

In addition to one or more of the features described above or below, or as an alternative, further embodiments could include where the desired position is further determined based on the estimated position of the two or more vehicles and the control commands from the commander node.

In addition to one or more of the features described above or below, or as an alternative, further embodiments could include where a triangulation calculation is applied to determine the position adjustment based on an orientation of the autonomous vehicle derived through the data from the gyroscope system in combination with the difference between the expected signal strength and the observed signal strength for each of the wireless communication links with the two or more vehicles.

In addition to one or more of the features described above or below, or as an alternative, further embodiments could include where each of the two or more vehicles applies a signal-strength based position adjustment as a self-correction to maintain the group in a formation.

In addition to one or more of the features described above or below, or as an alternative, further embodiments could include where at least one vehicle of the group communicates with at least one vehicle of a second group to maintain a relative position between the group and the second group. The second group can include a second commander node and a plurality of autonomous aerial vehicles.

According to further aspects of the invention, a method of spatial recognition in a group including an autonomous vehicle and two or more vehicles is provided. The method includes establishing a plurality of wireless communication links between the autonomous vehicle and the two or more vehicles in the group. The autonomous vehicle monitors a signal strength of each of the wireless communication links to determine an observed signal strength of each of the wireless communication links. A desired position of the autonomous vehicle is determined based on an expected signal strength of each of the wireless communication links. A position adjustment of the autonomous vehicle is initiated based on a difference between the expected signal strength and the observed signal strength in combination with data from a gyroscope system of the autonomous vehicle.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a group of vehicles including at least one autonomous vehicle uses wireless signal strength measurements of wireless communication links between multiple vehicles to perform relative position adjustments. When the group is arranged in a formation and one or more vehicles experience a change in relative position with respect to neighboring vehicles, the signal strength measurements in combination with data from an on-board gyroscope system can be used to determine one or more position adjustments to reestablish the formation. In an embodiment, each vehicle in the group can self-correct without receiving precise location information from the other vehicles in the group. Formation instructions and other commands can be provided by a commander node and relayed through the group, where members of the group collectively form a wireless mesh network.

Figure 1:
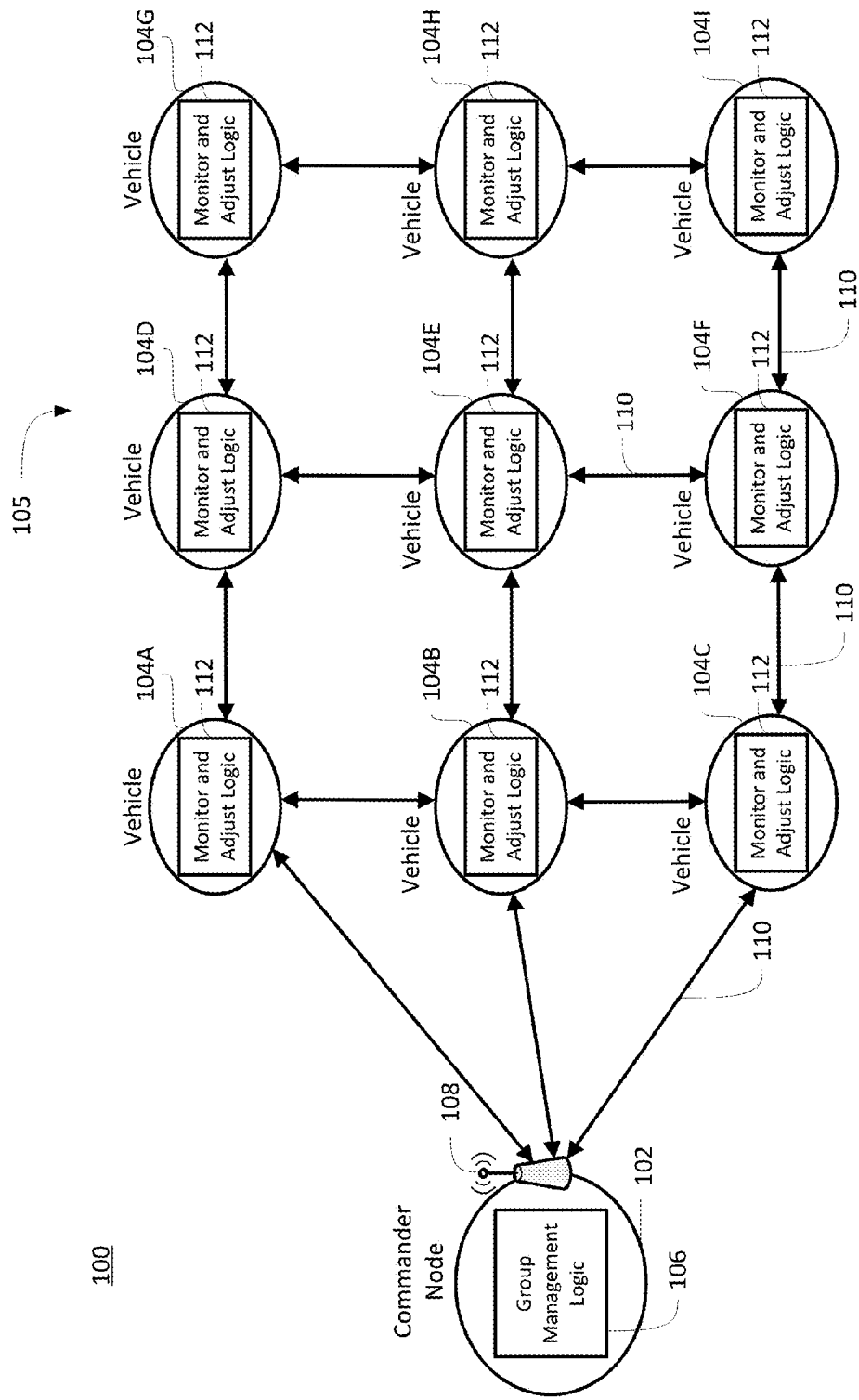
FIG. 1 schematically depicts a group of autonomous aerial vehicles in accordance with an embodiment.

FIG. 1 schematically depicts a group 100 of vehicles in accordance with an embodiment. A commander node 102 can send control commands to a plurality of vehicles 104A-104I over a wireless mesh network 105. The commander node 102 can be an aerial vehicle, a ground-based vehicle, a watercraft, a mobile device, or a stationary system. In one embodiment, the commander node 102 is a manned air vehicle, such as a fixed wing or rotor wing aircraft. In an alternate embodiment, the commander node 102 is an autonomous aerial vehicle. The commander node 102 can include group management logic 106 that determines control commands for the vehicles 104A-104I and relays the control commands through a wireless interface 108 to the vehicles 104A-104I over wireless communication links 110 of the wireless mesh network 105. In the example, of FIG. 1, the commander node 102 communicates directly with vehicles 104A, 104B, and 104C.

Vehicles 104A-104C can propagate messages from the commander node 102 to other neighboring nodes in the wireless mesh network 105. For instance, vehicle 104A communicates with vehicles 104B and 104D, and vehicle 104B also communicates with vehicles 104C and 104E. Vehicle 104C can also communicate with vehicle 104F. Vehicle 104D may communicate with vehicle 104E and 104G, while vehicle 104E also communicates with vehicles 104F and 104H. Vehicle 104F can communicate with vehicle 104I, while vehicle 104H also communicates with vehicles 104G and 104I. Accordingly, in the example of FIG. 1, each of the vehicles 104A-104I is operable to establish wireless communication links 110 with two or more of the vehicles 104A-104I. Additional wireless communication links 110 can also be implemented between the vehicles 104A-104I and the commander node 102. Although the vehicles 104A-104I are depicted in a two-dimensional grid pattern, it will be understood that a number of formations can be established by the commander node 102 with different geometries and altitude variations in three-dimensional space. Furthermore, a greater or lesser number of vehicles can be included in the group 100.

In one embodiment, each of the vehicles 104A-104I includes monitor and adjust logic 112 that monitors for control commands or other messages propagated through the wireless mesh network 105 from the commander node 102. As further described herein, the monitor and adjust logic 112 can also monitor signal strength of wireless communication links 110 relative to each neighboring node (e.g., another one of the vehicles 104A-104I or the commander node 102). The wireless signal strength can be used to determine a difference in an expected signal strength and an observed signal strength in order to determine a position adjustment.

Figure 2:
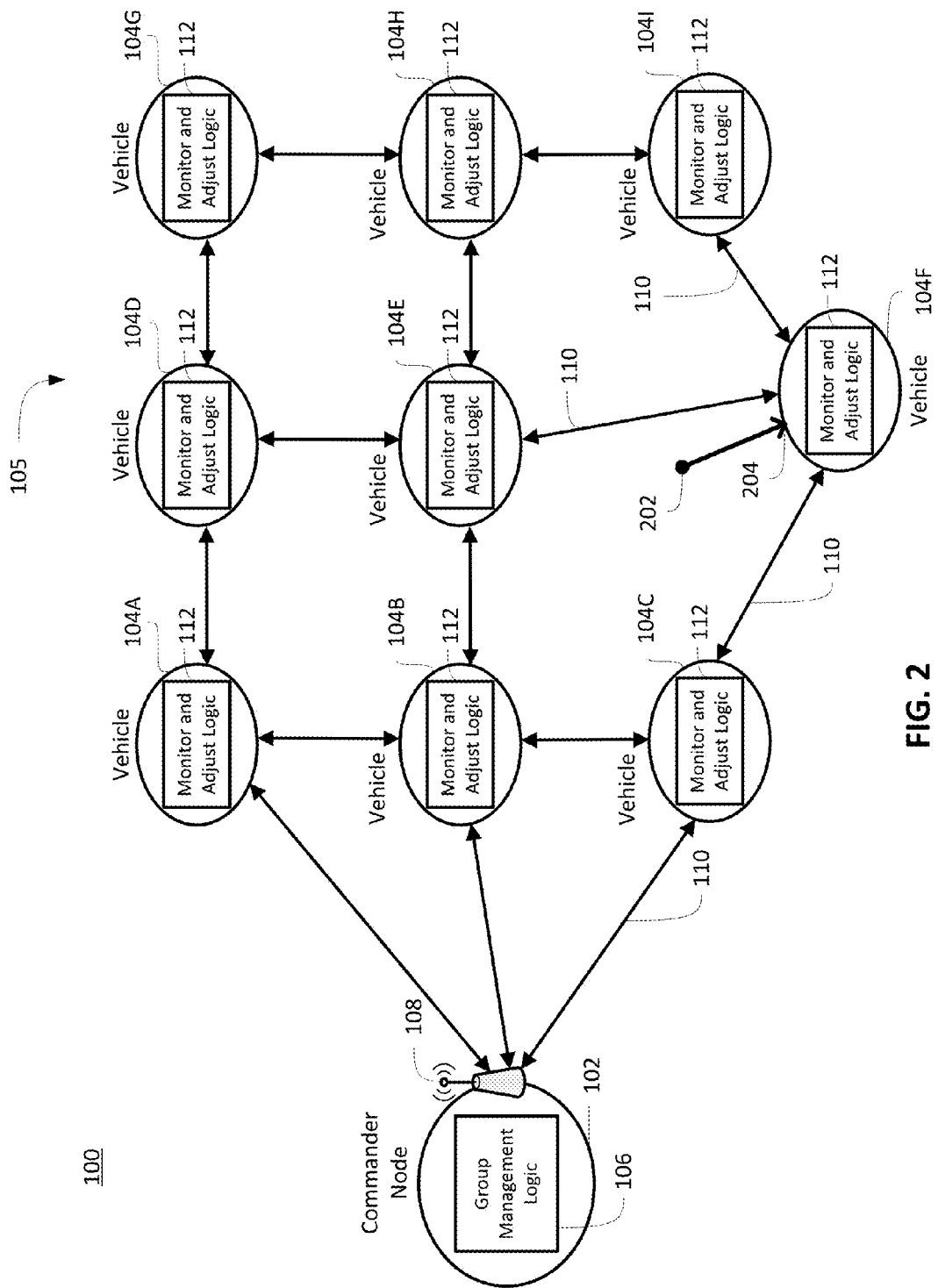
FIG. 2 schematically depicts the group of autonomous aerial vehicles of FIG. 1 after a disturbance event in accordance with an embodiment.

FIG. 2 schematically depicts the group 100 of FIG. 1 after a disturbance event in accordance with an embodiment. In this example, vehicle 104F has shifted from a desired position 202 to an undesired position 204 relative to vehicles 104C, 104E, and 104I. The monitor and adjust logic 112 of the vehicle 104F can observe the signal strength of the wireless communication links 110 relative to the vehicles 104C, 104E, and 104I that form a portion of the wireless mesh network 105. An expected signal strength of the wireless communication links 110 relative to the vehicles 104C, 104E, and 104I can be determined using knowledge of the formation configuration previously provided by the commander node 102 and a signal strength-to-distance mapping using, for instance, a lookup table (not depicted). Alternatively, the monitor and adjust logic 112 of the vehicle 104F can use ratios or other calculations to compare and discover changes in position. For example, while at the desired position 202, the monitor and adjust logic 112 of the vehicle 104F can determine time averaged signal strengths of the wireless communication links 110 relative to the vehicles 104C, 104E, and 104I, and use the time averaged signal strength as a comparison baseline against the observed signal strength such that a large enough deviation prompts initiation of a position adjustment.

In one embodiment, each of the vehicles 104A-104I can determine a weighted signal strength change of its respective wireless communication links 110 to trigger initiation of a position adjustment. For example, in FIG. 2, movement of the vehicle 104F from the desired position 202 to the undesired position 204 would result in observed changes in signal strength for all three of the wireless communication links 110 between the vehicle 104F and the vehicles 104C, 104E, and 104I. Similarly, the vehicles 104C, 104E, and 104I would detect a change in signal strength relative to only one of their respective wireless communication links 110. A vehicle 104A-104I having a larger percentage of change may rapidly attempt a position adjustment, while a vehicle 104A-104I may wait before initiating a position adjustment to allow a vehicle 104A-104I that is more severely out of alignment to attempt correction first. In the example of FIG. 2, 100% of the wireless communication links 110 of vehicle 104F experience a change in signal strength, while the numbers for vehicles 104C, 104E, and 104I are 33%, 25% and 50% respectively. A variable response time delay can ensure that attempts to correct the misalignment of the vehicle 104F do not propagate into further misalignments where neighboring node (i.e., vehicles 104C, 104E, and 104I) movements result in new misalignments within the group 100. Alternatively, each vehicle 104A-104I may know whether it is aligned or misaligned, and only misaligned vehicles 104A-104I may attempt position adjustment. For example, a vehicle 104A-104I that has observed no substantial change in position and no substantial change in signal strength relative to the commander node 102 may still be deemed aligned, while other vehicles 104A-104I that substantially shifted position may be deemed misaligned.

Figure 3:
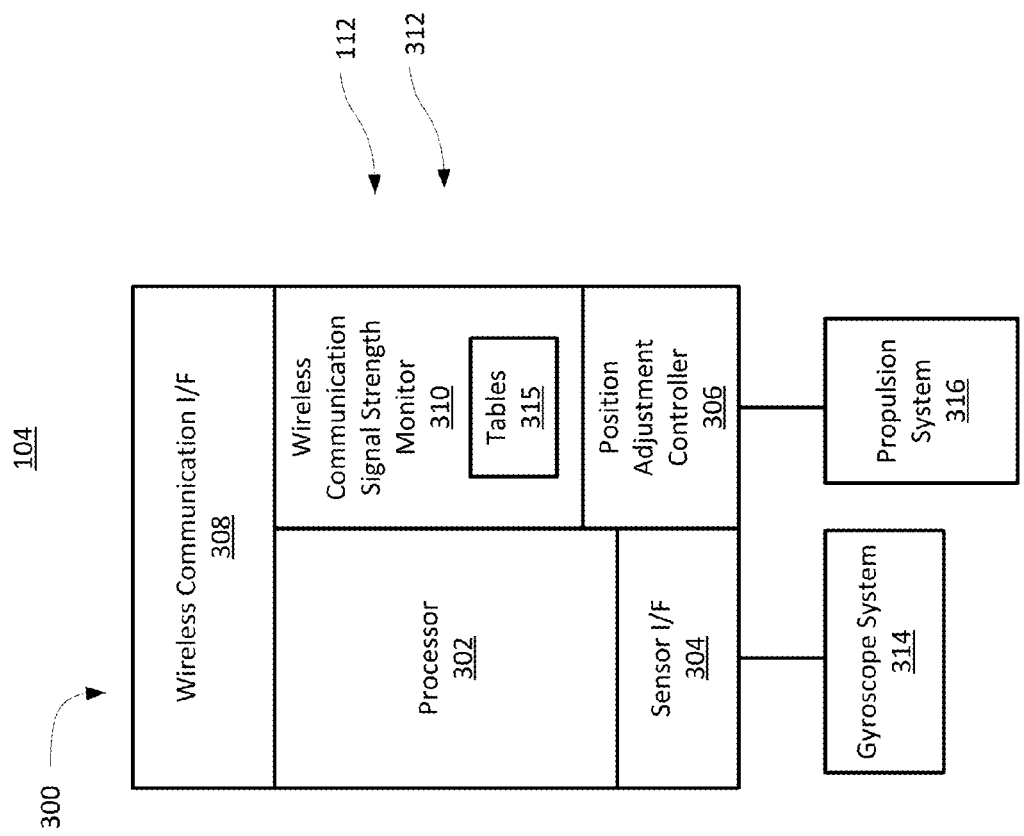
FIG. 3 schematically depicts a block diagram of a processing system in accordance with embodiments.

FIG. 3 schematically depicts a processing system 300 of a vehicle 104 (e.g., an autonomous vehicle) that may represent one of the vehicles 104A-104I of FIGS. 1 and 2 in accordance with an embodiment. In the example of FIG. 3, the processing system 300 includes a processor 302, a sensor interface 304, a position adjustment controller 306, a wireless communication interface 308, and a wireless communication signal strength monitor 310. The processor 302 can be any type or combination of computer processors, such as a microprocessor, microcontroller, digital signal processor, application specific integrated circuit, programmable logic device, and/or field programmable gate array. The position adjustment controller 306 and the wireless communication signal strength monitor 310 are embodiments of the monitor and adjust logic 112 of FIGS. 1 and 2. The position adjustment controller 306 and the wireless communication signal strength monitor 310 may be embodied as instructions stored in memory 312 that can be executed by the processor 302 to cause the vehicle 104 to perform functions of the monitor and adjust logic 112. The memory 312 is an example of a non-transitory computer readable storage medium tangibly embodied in the processing system 300 including executable instructions stored therein, for instance, as firmware.

In exemplary embodiments, the sensor interface 304 is coupled to a gyroscope system 314. The gyroscope system 314 may be part of a navigation system and flight control system of the vehicle 104. The gyroscope system 314 can include one or more gyroscopes (not depicted) to determine an orientation of the vehicle 104 along one or more axes. For example, multiple gyroscopes in the gyroscope system 314 can determine multi-axis orientation of the vehicle 104. The gyroscope system 314 may also be used to provide flight stability to the vehicle 104.

The wireless communication interface 308 enables communication on the wireless mesh network 105 of FIGS. 1 and 2 via wireless communication links 110 of FIGS. 1 and 2. The wireless communication signal strength monitor 310 can monitor each of the wireless communication links 110 of FIGS. 1 and 2 connected to the wireless communication interface 308 to observe and track changes in signal strength. The wireless communication signal strength monitor 310 may also perform a signal strength-to-distance mapping to estimate distances or changes in distances between the vehicle 104 and other nodes of the wireless mesh network 105 of FIGS. 1 and 2. Signal strength-to-distance mapping may be performed as a look-up operation. As one example, during a system calibration procedure, one or more mapping tables 315 can be developed by observing signal strength relative to distances. A series of selectable mapping tables 315 can be developed where noticeable differences in the relationship between signal strength and distance are quantified, for example, based on weather conditions, terrain, background noise levels, and the like. In a multiple table embodiment, the commander node 102 of FIGS. 1 and 2 may inform the vehicle 104 which of the mapping tables 315 to select for current or anticipated conditions.

The position adjustment controller 306 can receive inputs from the sensor interface 304 and the wireless communication signal strength monitor 310 to determine a position adjustment for the vehicle 104. The position adjustment controller 306 can be coupled to a propulsion system 316 that further controls movement of the vehicle 104. The propulsion system 316 can include engine controls and flight controls to actuate one or more control surfaces of the vehicle 104, where the vehicle 104 is an autonomous aerial vehicle. The position adjustment controller 306 may use a triangulation calculation to determine a position adjustment based on an orientation of the vehicle 104 derived through the data from the gyroscope system 314 in combination with a difference between an expected signal strength and an observed signal strength for each of the wireless communication links 110 with two or more of the vehicles 104A-104I of FIGS. 1 and 2.

Figure 4:
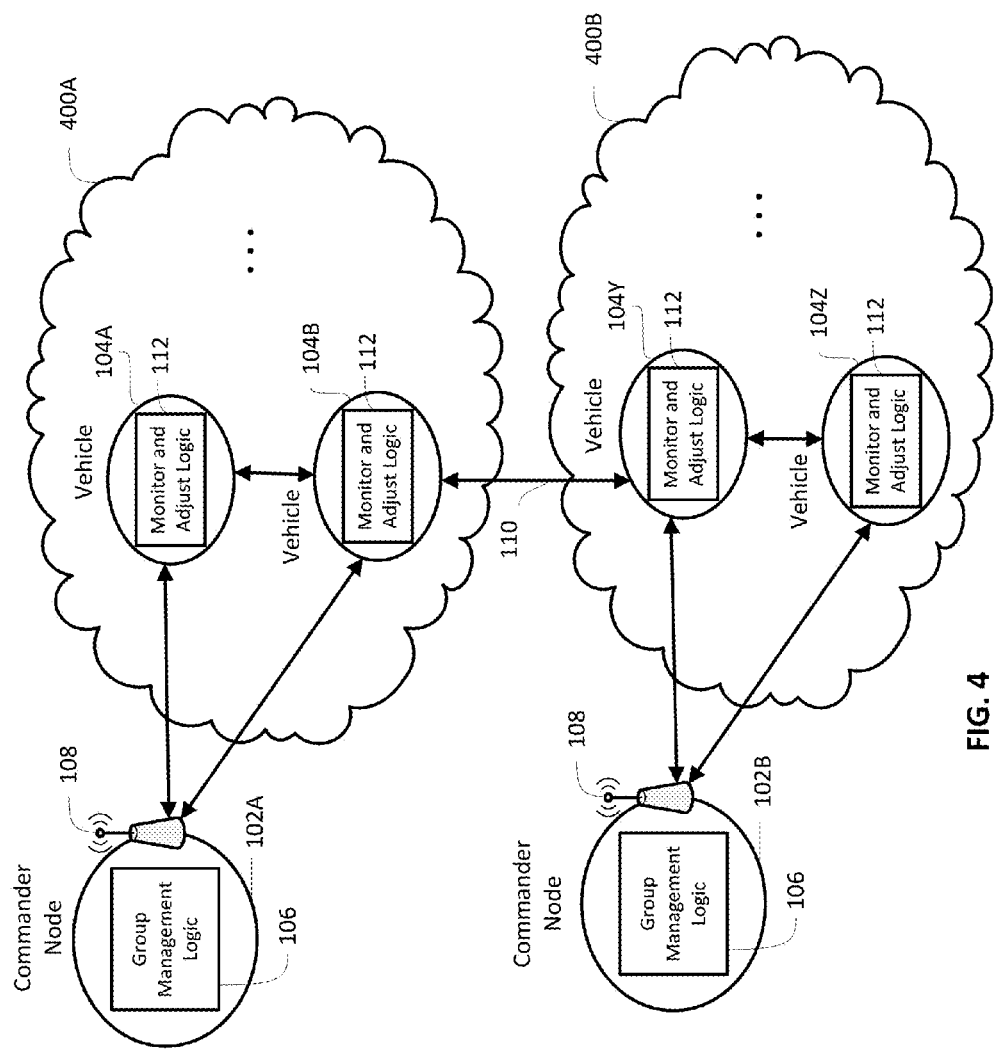
FIG. 4 schematically depicts multiple groups of autonomous aerial vehicles in accordance with an embodiment.

FIG. 4 schematically depicts multiple groups of autonomous aerial vehicles in accordance with an embodiment. In the example of FIG. 4, a group 400A can include a plurality of autonomous aerial vehicles, depicted as vehicles 104A, 104B, and others. A commander node 102A may also be considered part of the group 400A, where the commander node 102A provides control commands to the group 400A. A second group 400B can include a plurality of autonomous aerial vehicles, depicted as vehicles 104Y, 104Z, and others. A second commander node 102B may also be considered part of the second group 400B, where the second commander node 102B provides control commands to the second group 400B. When vehicles 104 of groups 400A and 400B are in proximity to each other, one or more wireless communication links 110 can be established between the groups 400A and 400B. In the example of FIG. 4, a wireless communication link 110 is established between vehicle 104B of group 400A and vehicle 104Y of the second group 400B. Therefore, at least one vehicle 104B of group 400A communicates with at least one vehicle 104Y of the second group 400B to maintain a relative position between the group 400A and the second group 400B. This can create a cluster or larger formation from multiple smaller formations having separate commander nodes 102A, 102B.

Figure 5:
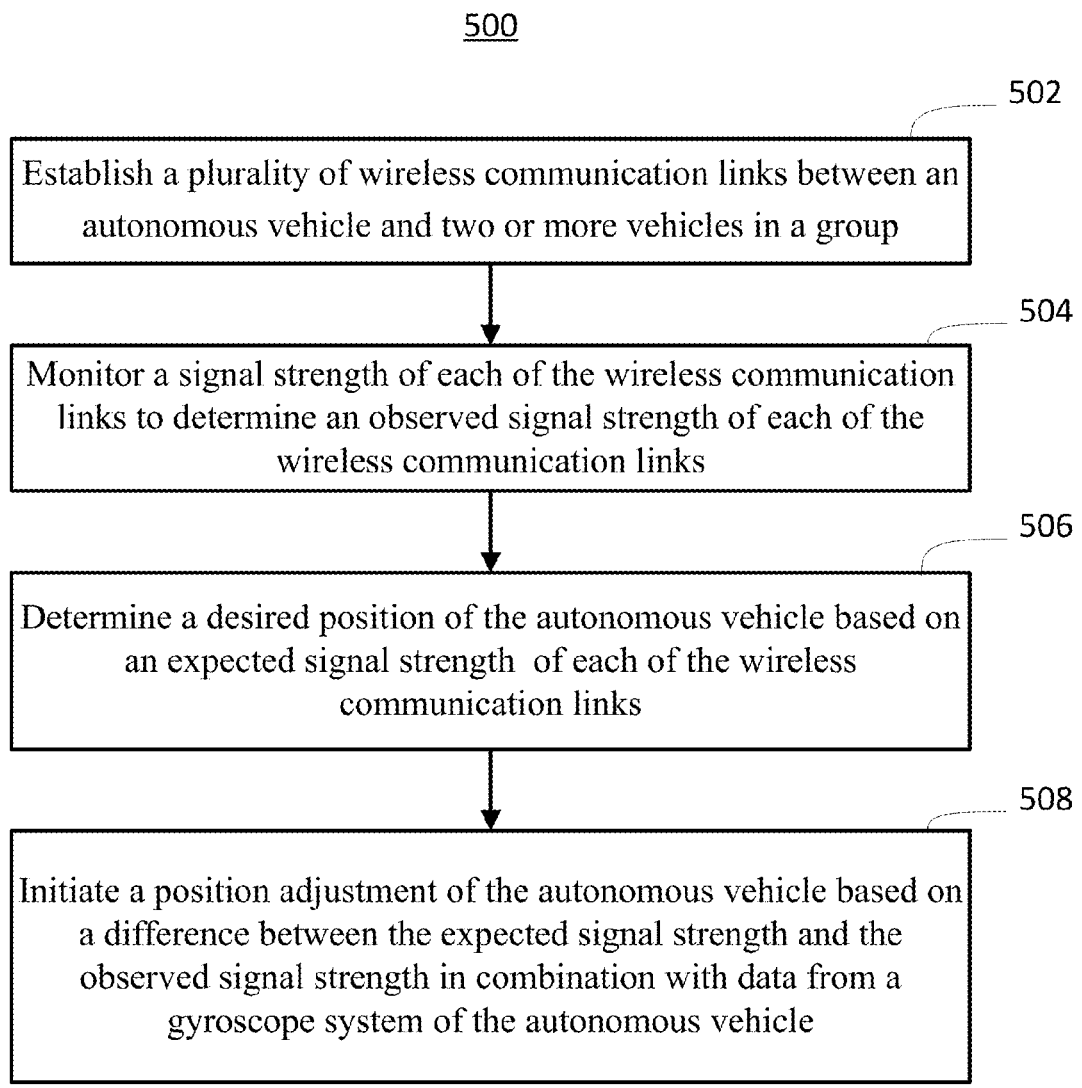
FIG. 5 depicts a process for spatial management in an autonomous vehicle group in accordance with an embodiment.

FIG. 5 depicts a process 500 for spatial management in an autonomous vehicle group in accordance with an embodiment. The process 500 as depicted in FIG. 5 can include additional elements beyond those depicted in FIG. 5 and may be applicable to elements as described in reference to FIGS. 1-4. For purposes of explanation, the process 500 is described in reference to FIGS. 1-5.

At block 502, wireless communication links 110 are established between an autonomous vehicle and two or more vehicles in a group, such as vehicle 104F relative to vehicles 104C, 104E, and 104I.

At block 504, the autonomous vehicle, such as vehicle 104F, monitors a signal strength of each of the wireless communication links 110 to determine an observed signal strength of each of the wireless communication links 110.

At block 506, a desired position, such as desired position 202, of the autonomous vehicle is determined based on an expected signal strength of each of the wireless communication links 110. For example, with respect to FIG. 2, the desired position 202 need not be precisely where the vehicle 104F was previously located, as the group 100 can move. An expected signal strength at the desired position 202 can serve as a target to balance signal strength levels relative to vehicles 104C, 104E, and 104I as the vehicle 104F determines a path to the desired position 202. The desired position 202 may also be based on control commands received from a commander node 102 through a wireless mesh network 105.

At block 508, a position adjustment of the autonomous vehicle is initiated based on a difference between the expected signal strength and the observed signal strength in combination with data from a gyroscope system of the autonomous vehicle, such as gyroscope system 314 of FIG. 3. Vehicle 104F, as the autonomous vehicle, can track an estimated position of the two or more vehicles 104C, 104E, 104I based on a signal strength-to-distance mapping applied to the observed signal strength. The desired position 202 can be determined based on the estimated position of the two or more vehicles 104C, 104E, 104I and the control commands from the commander node 102. As previously described, a triangulation calculation can be applied to determine the position adjustment based on an orientation of the vehicle 104F derived through the data from the gyroscope system 314 in combination with the difference between the expected signal strength and the observed signal strength for each of the wireless communication links 110 with the two or more vehicles 104C, 104E, 104I. Each of the two or more vehicles 104C, 104E, 104I can also apply a signal-strength based position adjustment as a self-correction to maintain the group 100 in a formation.

Technical effects include using a wireless signal strength in combination with data from a gyroscope system to enable autonomous vehicles in a group to self-correct for position changes to maintain a desired formation, thereby providing low-power spatial recognition in an autonomous vehicle group.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An autonomous vehicle comprising:
   a sensor interface coupled to a gyroscope system;
   a wireless communication interface;
   a processor; and
   memory having instructions stored thereon that, when executed by the processor, cause the autonomous vehicle to:
      establish a plurality of wireless communication links with two or more vehicles in a group comprising the autonomous vehicle and the two or more vehicles;
      monitor a signal strength of each of the wireless communication links to determine an observed signal strength of each of the wireless communication links;
      determine a desired position of the autonomous vehicle based on an expected signal strength of each of the wireless communication links;
      receive control commands from a commander node through the plurality of wireless communication links; and
      initiate a position adjustment of the autonomous vehicle based on the control commands and a difference between the expected signal strength and the observed signal strength in combination with data from the gyroscope system.

2. The autonomous vehicle of claim 1, wherein the wireless communication links form a portion of a wireless mesh network.

3. The autonomous vehicle of claim 1, wherein the autonomous vehicle and the two or more vehicles are autonomous aerial vehicles and are controlled in the group by the commander node.

4. The autonomous vehicle of claim 1, wherein the autonomous vehicle tracks an estimated position of the two or more vehicles based on a signal strength-to-distance mapping applied to the observed signal strength.

5. The autonomous vehicle of claim 4, wherein the desired position is further determined based on the estimated position of the two or more vehicles and the control commands from the commander node.

6. The autonomous vehicle of claim 1, wherein a triangulation calculation is applied to determine the position adjustment based on an orientation of the autonomous vehicle derived through the data from the gyroscope system in combination with the difference between the expected signal strength and the observed signal strength for each of the wireless communication links with the two or more vehicles.

7. The autonomous vehicle of claim 1, wherein each of the two or more vehicles applies a signal-strength based position adjustment as a self-correction to maintain the group in a formation.

8. The autonomous vehicle of claim 1, wherein at least one vehicle of the group communicates with at least one vehicle of a second group to maintain a relative position between the group and the second group, the second group comprising a second commander node and a plurality of autonomous aerial vehicles.

9. A method of spatial recognition in a group comprising an autonomous vehicle and two or more vehicles, the method comprising:
   establishing a plurality of wireless communication links between the autonomous vehicle and the two or more vehicles in the group;
   monitoring, by the autonomous vehicle, a signal strength of each of the wireless communication links to determine an observed signal strength of each of the wireless communication links;
   determining a desired position of the autonomous vehicle based on an expected signal strength of each of the wireless communication links;
   receiving control commands from a commander node through the plurality of wireless communication links; and
   initiating a position adjustment of the autonomous vehicle based on the control commands and a difference between the expected signal strength and the observed signal strength in combination with data from a gyroscope system of the autonomous vehicle.

10. The method of claim 9, wherein the autonomous vehicle tracks an estimated position of the two or more vehicles based on a signal strength-to-distance mapping applied to the observed signal strength, and the desired position is further determined based on the estimated position of the two or more vehicles and the control commands from the commander node.

11. The method of claim 9, wherein a triangulation calculation is applied to determine the position adjustment based on an orientation of the autonomous vehicle derived through the data from the gyroscope system in combination with the difference between the expected signal strength and the observed signal strength for each of the wireless communication links with the two or more vehicles.

12. The method of claim 9, wherein each of the two or more vehicles applies a signal-strength based position adjustment as a self-correction to maintain the group in a formation.

13. The method of claim 9, wherein at least one vehicle of the group communicates with at least one vehicle of a second group to maintain a relative position between the group and the second group, the second group comprising a second commander node and a plurality of autonomous aerial vehicles.

* * * * *